Sept. 15, 1964 J. FREI 3,148,889
COLLET CLOSURE
Filed April 23, 1962 4 Sheets-Sheet 1

INVENTOR.
JOSEPH FREI
BY *Wells & St. John*
ATTYS.

Sept. 15, 1964  J. FREI  3,148,889
COLLET CLOSURE
Filed April 23, 1962  4 Sheets-Sheet 4

INVENTOR.
JOSEPH FREI
BY
ATTYS.

3,148,889
COLLET CLOSURE

Joseph Frei, 8021 W. Medford Ave., Milwaukee, Wis., assignor, by mesne assignments, of fifty-one percent to Richard B. Howell, thirty-four percent to Joseph Frei, and fifteen percent to John A. Kleinhuizen
Filed Apr. 23, 1962, Ser. No. 189,408
3 Claims. (Cl. 279—4)

This invention relates to a novel collet closure for use on turret lathes or hand screw machines.

This invention is concerned with an air-operated collet closing device designed for use on turret lathes. These conventional machines utilize a collet to grasp the bar stock during the turning operations. In some instances the stock is intermittently pushed through the collet from the rear of the lathe headstock, while in other installations the work piece is inserted into the collet a short distance and grasped in that position. The present invention contemplates an automatic closure device capable of being used to adapt conventional lathes for automatic lathe operations.

A first object of this invention is to provide a closure which is relatively simple to manufacture and which can be readily repaired when necessary. The simplicity of operation of this closure recommends its use in automated operations.

Another object of this invention is to provide a closure device which is relatively portable—that is, the closure device can be easily mounted or dismounted relative to a particular machine when necessary. The device requires no special mounting equipment and does not entail modification of the existing lathe structure.

Another object of this invention is to provide an accurately controlled mechanical closure which is operated by air pressure so as to provide quick and effective operating characteristics to the device. This is of utmost importance in the intended applications wherein this device is used on screw machines.

These and further objects will be evident from a study of the following description when taken in conjunction with the accompanying drawings which illustrate a preferred form of the invention and which show its relationship to a typical collet. This form of the invention is exemplary and is not intended to limit or restrict the scope of the invention except as that scope is limited by the claims which follow.

Figure 1:
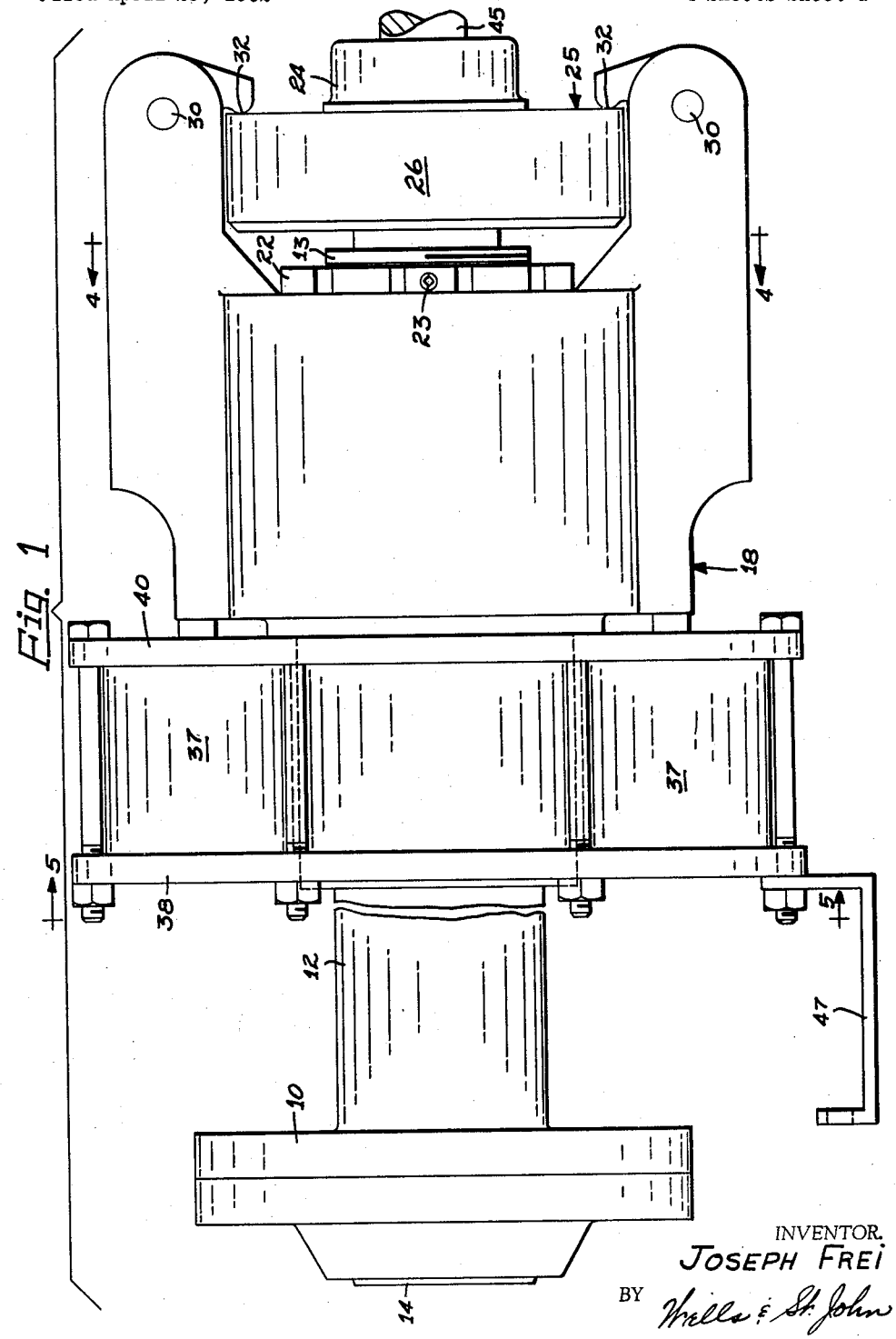
FIGURE 1 is a side view of a collet showing the collet closure mounted thereon, the intermediate portions of the collet spindle being broken away.
Figure 2:
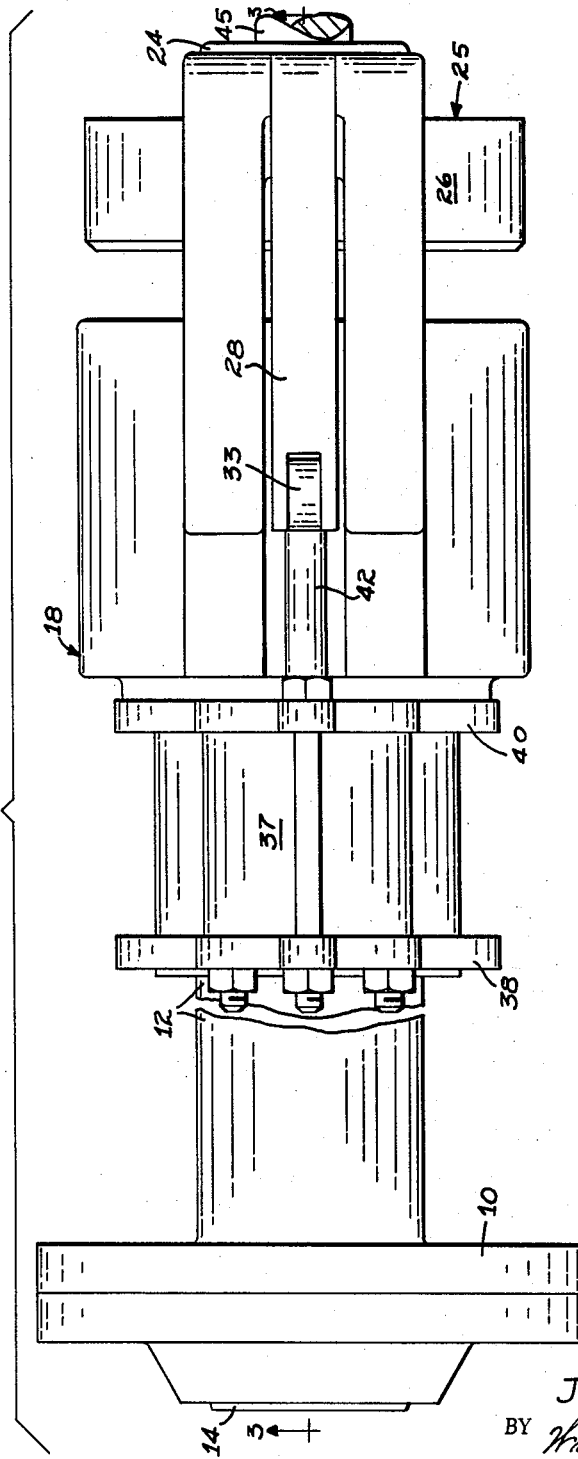
FIGURE 2 is a top view of the assembly shown in FIGURE 1.
Figure 3:
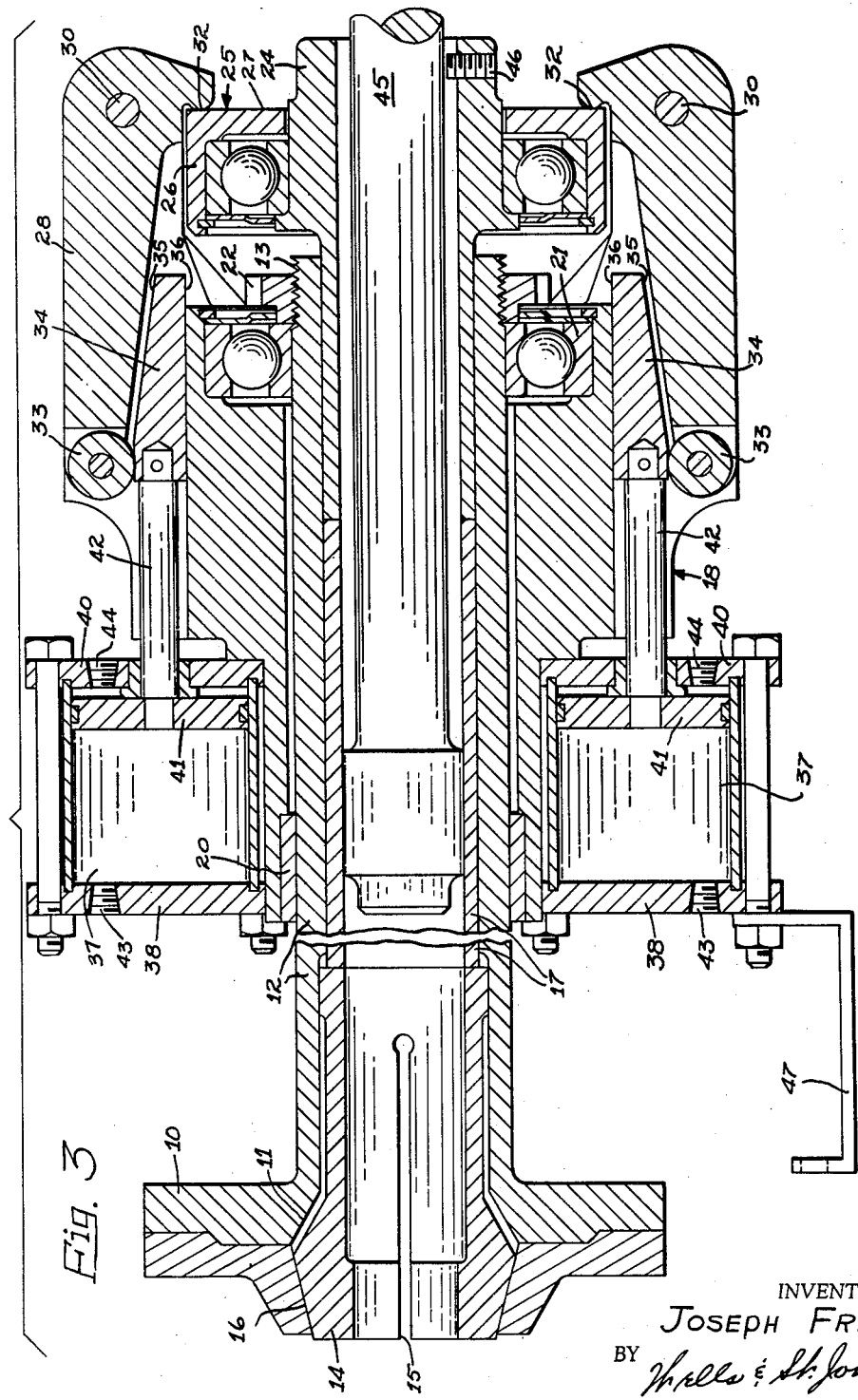
FIGURE 3 is a sectional view taken along line 3—3 in FIGURE 2.
Figure 4:
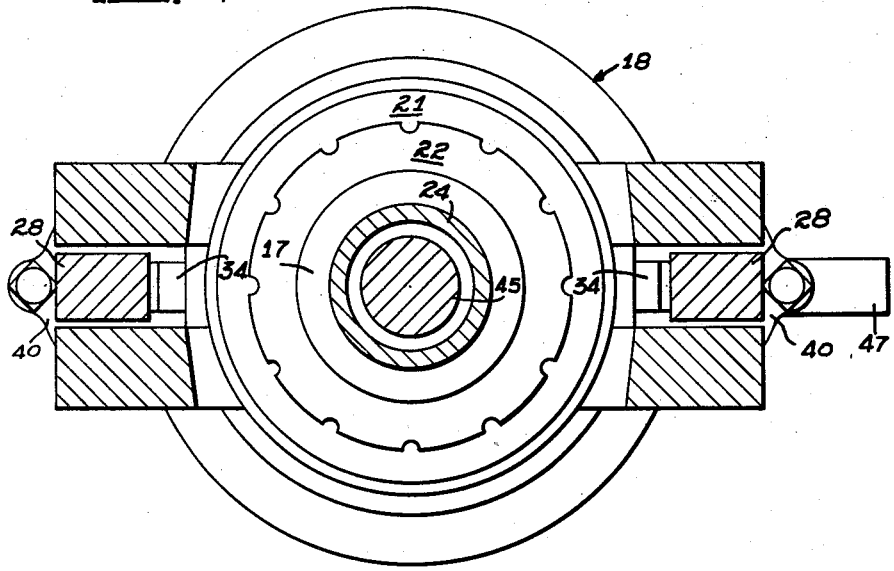
FIGURE 4 is a sectional view taken along line 4—4 in FIGURE 1.
Figure 5:
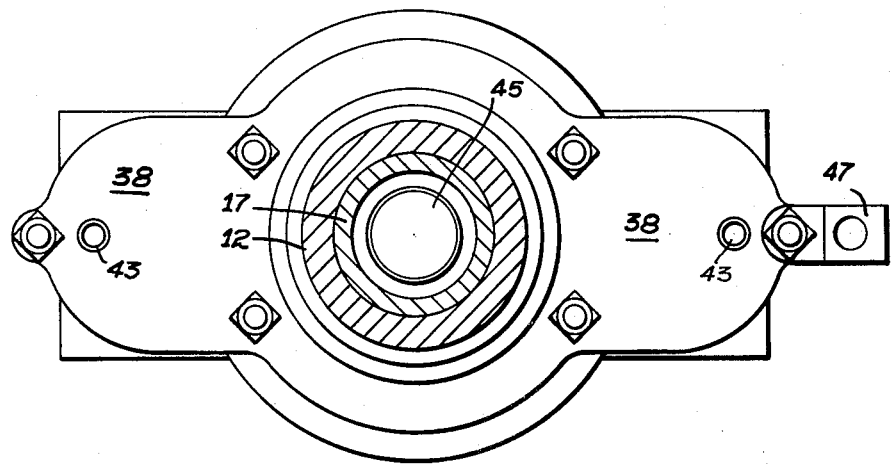
FIGURE 5 is a sectional view taken along line 5—5 in FIGURE 1.

The basic parts of the collet closure as constructed according to this invention are best seen in FIGURE 3 which is a longitudinal section view through the assembly. The exterior views of the closure illustrated in FIGURES 1 and 2 will aid in an appreciation of the exterior design of the various components. The collet with which this closure is utilized is a conventional sub-assembly of a bar turret lathe and is shown in the drawings without illustrating the head stock within which it is mounted. The collet assembly includes a wedge plate 10 on the head stock at the side thereof which shall be referred to herein as the front or forward end of the head stock. This end faces the operating areas of the lathe assembly. The opposite end of the head stock shall be referred to herein as the rear end and all elements of this closure shall be described consistently with this arbitrary reference designation. The wedge plate 10 is provided with an internal conical surface 11 which faces rearwardly relative to the head stock. Secured to the wedge plate 10 and extending rearwardly therefrom is a tubular spindle 12 which terminates in a threaded portion 13 protruding beyond the rear end of the head stock.

A collet 14 is slidably mounted within the spindle 12 and wedge plate 10 and includes a conical front surface 16 which is split at 15 so as to allow the collet 14 to contract radially inward to thereby grip the work piece (not shown). The collet 14 is positioned relative to the wedge plate 10 by means of a tubular pusher tube 17 which also is slidably mounted within the spindle 12. The collet 14 is keyed relative to the spindle 12 and rotates therewith as a unit. By moving the collet 14 forwardly or rearwardly relative to wedge plate 10 and spindle 12, one may release or grip a bar work piece mounted within the collet 14.

Rotatably mounted on the exterior of the spindle 12 is a frame yoke 18. The yoke 18 is mounted on a front sleeve bearing 20 and a rear ball bearing 21. The rear ball bearing 21 is provided with a longitudinal adjusting nut 22 and a locking screw 23 which is adapted to secure the nut 22 at the desired longitudinal position relative to the spindle 12. The adjusting nut 22 is utilized to move the yoke 18 along the spindle 12 by interaction with the threaded portion 13 of spindle 12. In operation, the yoke 18 is longitudinally fixed relative to the spindle 12, but the spindle 12 is free to rotate independently of yoke 18.

Slidably mounted within the spindle 12 and protruding rearwardly therefrom is a pusher sleeve 24. The pusher sleeve 24 abuts the rear end of the tube 17 which in turn abuts the rear end of collet 14. Mounted on the sleeve 24 is a rear thrust bearing assembly 25 which is adapted to transmit thrust in a forward direction to the sleeve 24. The bearing assembly 25 includes an outer collar 26 having a rearwardly facing surface 27.

In order to longitudinally urge the pusher sleeve 24 toward the collet 14 there is provided a pair of levers 28 which are pivotally mounted on the yoke 18 by means of pivot pins 30. The axes of the levers 28 are located in a single plane which is perpendicular to the spindle axis. The levers 28 are formed so as to contact the surface 27 of the bearing assembly 25 along a locus designated in the drawings by the numeral 32.

In order to pivot the levers 28 about their respective pivotal axes, there is provided a wedge 34 which respectively contacts the lever assemblies. Each wedge 34 contacts a roller 33 mounted on the respective lever 28. The wedge 34 includes an inclined surface 35 which decreases in radial thickness relative to the spindle axis in a rearward direction. At its maximum thickness the surface 35 blends into a flat area 36 at its forward end.

In order to move the wedges 34, which are slidably mounted on the yoke 18, there are provided individual pneumatic cylinders 37 which are mounted between end plates 38 and 40. The cylinders 37 each include a piston 41 having a rod 42 attached thereto and extending rearwardly to a connection with the respective wedge 34 which it operates. Each cylinder is provided with a front port 43 and a rear port 44 which are operatively connected to suitable air lines in order that the cylinders 37 may be utilized as double-acting pneumatic cylinder assemblies.

The operation of this collet closure is very simple to see with reference to FIGURE 3. The collet closure is designed for automatic work wherein a work piece of a specific diameter will be intermittently grasped and released by the collet 14. Whether the work piece is continuously fed from the rear of the machine in the direction shown to the left in FIGURE 3 or whether the work piece is to be fed to the right and abut a collet stop 45 positioned by a set screw 46 is immaterial to the function of the closure. In either case the collet will be opened by applying positive air pressure to the port 44 of each cylinder 37 while exhausting the remaining port 43. This action will cause the wedges 34 to move to the left in FIGURE 3 and the spring nature of the split collet 14 will urge the pusher tube 17 and sleeve 24 to the right to thereby maintain the roller 33 in contact with the wedges 34. The positioning of yoke 18 by means of adjusting nut 22 should be such that a slight pressure will be maintained on the thrust bearing assembly 25 by the levers 28 at this relaxed position of the wedges 34.

When the work piece has been moved longitudinally along the spindle axis to the desired operating position, the air pressure will be reversed and positive pressure applied to the front port 43, while the rear port 44 of the cylinder will be exhausted. This will cause the wedges 34 to be pushed to the right in FIGURE 3 and thereby raise the rollers 33 radially outward to displace the sleeve 24 to the left or in a forward direction. This action, although relatively slight, shall be sufficient to provide the necessary pressure on the work piece located between the jaws of the collet 14. The flat area 36 of each wedge 34 insures that the excursion of the bearing assembly 25 and sleeve 24 is accurately limited in each operation and also acts as a detent to maintain the necessary clamping pressure on the collet 14 during the lathe operations.

Since the collet closure is to be air-controlled, it is necessary that suitable hoses (not shown) be provided to the ports 43 and 44. Since this necessitates the use of a stationary assembly, it is necessary to provide a simple holding bracket 47 which merely secures to the lathe head stock to maintain the yoke 18 in a stationary position about the spindle axis. The specific configuration of this bracket 47 is immaterial to the present invention and may be varied to meet existing conditions on individual lathes. It is important to note that the wedge plate 10, spindle 12, collet 14, tube 17 and sleeve 24 all rotate as a unit along with the optional collet stop 45. The yoke 18 and all elements mounted thereon are maintained in a stationary position at all times.

The basic concepts of this invention are equally well adapted to a draw type collet wherein the tube 24 becomes a draw rod usable to pull the collet against a rearward facing internal conical surface of a wedge plate. In this instance, the wedge 34 must be reversed and used to cause lever 28 to pull or push ring 27 to the right as shown in FIGURE 3.

While two cylinders and the associated mechanisms have been illustrated, it is obvious that a larger number of cylinders may be used where the thrust required necessitates a greater force being asserted on the bearing assembly 25. The specific details of the device as illustrated in the drawings are not intended to be restrictive of the scope of my invention and therefore I intend that this invention be defined only by the following claims.

Having thus described my invention, I claim:

1. In a collet closure for a lathe headstock having a wedge plate including an internally coned surface, an integral tubular spindle having a longitudinal central axis and fixed to the wedge plate, said spindle extending rearwardly therefrom beyond the headstock, and a coaxial radially contractible collet having an externally coned surface mounted within said spindle in abutment with the internally coned surface of the wedge plate;

yoke means adapted to be mounted on the rear end of the spindle in a fixed longitudinal position relative to the spindle;

tube means slidably mounted within the spindle in operative engagement with the rear end of the collet;

a plurality of levers mounted on said yoke means in equiangular locations about the spindle axis for pivotal motion about axes lying in a plane perpendicular to the spindle axis, said levers being in contact engagement with a surface of said tube means perpendicular to the spindle axis;

a plurality of wedges movably mounted on said yoke means for motion parallel to the spindle axis, said wedges being respectively mounted on said yoke means in engagement with said levers, said wedges each being of decreasing radial thickness in a longitudinal direction relative to the spindle axis, whereby longitudinal motion of said wedges will cause said levers to effect longitudinal motion of said tube means relative to said spindle;

and individual cylinders mounted on said yoke means respectively connected to said wedges adapted to selectively effect longitudinal motion of said wedges relative to said yoke means.

2. In combination with a lathe headstock having a wedge plate including an internally coned surface, a tubular spindle having a longitudinal central axis and fixed to the wedge plate, said spindle extending rearwardly therefrom beyond the headstock, and a coaxial radially contractible collet having an externally coned surface slidably mounted within said spindle in abutment with the internally coned surface of the wedge plate;

a yoke rotatably mounted on the rear end of the spindle for independent rotation about the spindle axis, said yoke being fixed longitudinally relative to the spindle;

a tube slidably mounted within the spindle in operative engagement with the rear end of the collet;

a coaxial thrust bearing assembly mounted on the pusher tube adapted to transmit axial thrust forces to the tube;

a plurality of levers mounted on said yoke in equiangular locations about the spindle axis for pivotal motion about axes lying in a plane perpendicular to the spindle axis, said levers being in contact with a surface of said thrust bearing assembly perpendicular to the spindle axis;

a plurality of wedges movably mounted on said yoke for motion parallel to the spindle axis, said wedges being respectively mounted on said yoke in engagement with said levers, said wedges each being of decreasing radial thickness in a longitudinal direction relative to the spindle axis, whereby longitudinal motion of said wedges will cause said levers to effect longitudinal motion of said thrust bearing assembly relative to said spindle;

and individual cylinders mounted on said yoke respectively connected to said wedges adapted to selectively effect longitudinal motion of said wedges relative to said yoke means.

3. In combination with a lathe headstock having a wedge plate including an internally coned surface, a tubular spindle having a longitudinal central axis fixed to the wedge plate, said spindle extending rearwardly therefrom beyond the headstock, and a coaxial radially contractible collet having an externally coned surface slidably mounted within said spindle in abutment with the internally coned surface of the wedge plate;

a yoke rotatably mounted on the rear end of the spindle for independent rotation about the spindle axis, said yoke being fixed longitudinally relative to the spindle;

a tube slidably mounted within the spindle in operative engagement with the rear end of the collet;

a coaxial thrust bearing assembly mounted on the pusher tube adapted to transmit axial thrust forces to the tube;

a plurality of levers mounted on said yoke in equiangular locations about the spindle axis for pivotal motion about axes lying in a plane perpendicular to the spindle axis, said levers being in contact with a rearwardly facing surface of said thrust bearing assembly perpendicular to the spindle axis;

a plurality of wedges movably mounted on said yoke for motion parallel to the spindle axis, said wedges being respectively mounted on said yoke at locations interposed radially between said spindle and said levers in engagement with said levers, said wedges each being of decreasing radial thickness in a rearward direction relative to the spindle axis, whereby rearward motion of said wedges will cause the levers to push forwardly on the thrust bearing assembly; and individual cylinders mounted on said yoke respectively connected to said wedges adapted to selectively effect longitudinal motion of said wedges relative to said yoke means.

References Cited in the file of this patent
UNITED STATES PATENTS

| | | |
|---|---|---|
| 2,366,908 | Jenkins | Jan. 9, 1945 |
| 2,565,330 | Sundt | Aug. 21, 1951 |
| 2,733,071 | Renoux | Jan. 31, 1956 |
| 2,826,942 | Swanson | Mar. 18, 1958 |